US006893042B1

(12) United States Patent
Ponceau et al.

(10) Patent No.: US 6,893,042 B1
(45) Date of Patent: May 17, 2005

(54) ASSISTING DEVICE FOR UNFOLDING A MOTOR VEHICLE INFLATABLE AIRBAG

(75) Inventors: Philippe Ponceau, Le Perray en Yvelines (FR); Robert Guyot, Chateauroux (FR)

(73) Assignees: Renault, Boulogne Billancourt (FR); Eurostyle, Verrieres le Buisson (FR)

( * ) Notice: Subject to any disclaimer, the term of this patent is extended or adjusted under 35 U.S.C. 154(b) by 29 days.

(21) Appl. No.: 10/070,816

(22) PCT Filed: Sep. 8, 2000

(86) PCT No.: PCT/FR00/02483

§ 371 (c)(1),
(2), (4) Date: Nov. 12, 2002

(87) PCT Pub. No.: WO01/19650

PCT Pub. Date: Mar. 22, 2001

(30) Foreign Application Priority Data

Sep. 10, 1999 (FR) .................................. 99 11342

(51) Int. Cl.[7] ............................................. B60R 21/22
(52) U.S. Cl. ................................................. 280/730.2
(58) Field of Search ........................ 280/730.2, 730.1, 280/728.3, 728.2

(56) References Cited

U.S. PATENT DOCUMENTS

| 6,340,172 B1 * | 1/2002 | Ohlert et al. ............ 280/730.2 |
| 6,364,349 B1 * | 4/2002 | Kutchey et al. ......... 280/730.2 |
| 6,729,645 B2 * | 5/2004 | Amamori ................. 280/730.2 |

FOREIGN PATENT DOCUMENTS

| DE | 298 03 985 | 7/1998 |
| DE | 198 26 511 | 12/1998 |
| EP | 0 904 992 | 3/1999 |
| FR | 1 584 875 | 1/1970 |
| FR | 2 781 738 | 2/2000 |
| GB | 2 296 476 | 7/1996 |

* cited by examiner

Primary Examiner—Faye M. Fleming
(74) Attorney, Agent, or Firm—Oblon, Spivak, McClelland, Maier & Neustadt, P.C.

(57) ABSTRACT

An assisting device for unfolding an inflatable airbag, located at the junction of at least two fitting elements of a motor vehicle body parts. The first of the two fitting elements is fixed and the second of the two fitting elements is configured to be deformed under the pressure exerted by the inflatable airbag when it moves. A guiding surface of an outlet zone of the inflatable airbag is oriented towards an end portion of the second fitting element and is located at the outer limit of a co-operating zone between the first and second fitting elements.

5 Claims, 1 Drawing Sheet

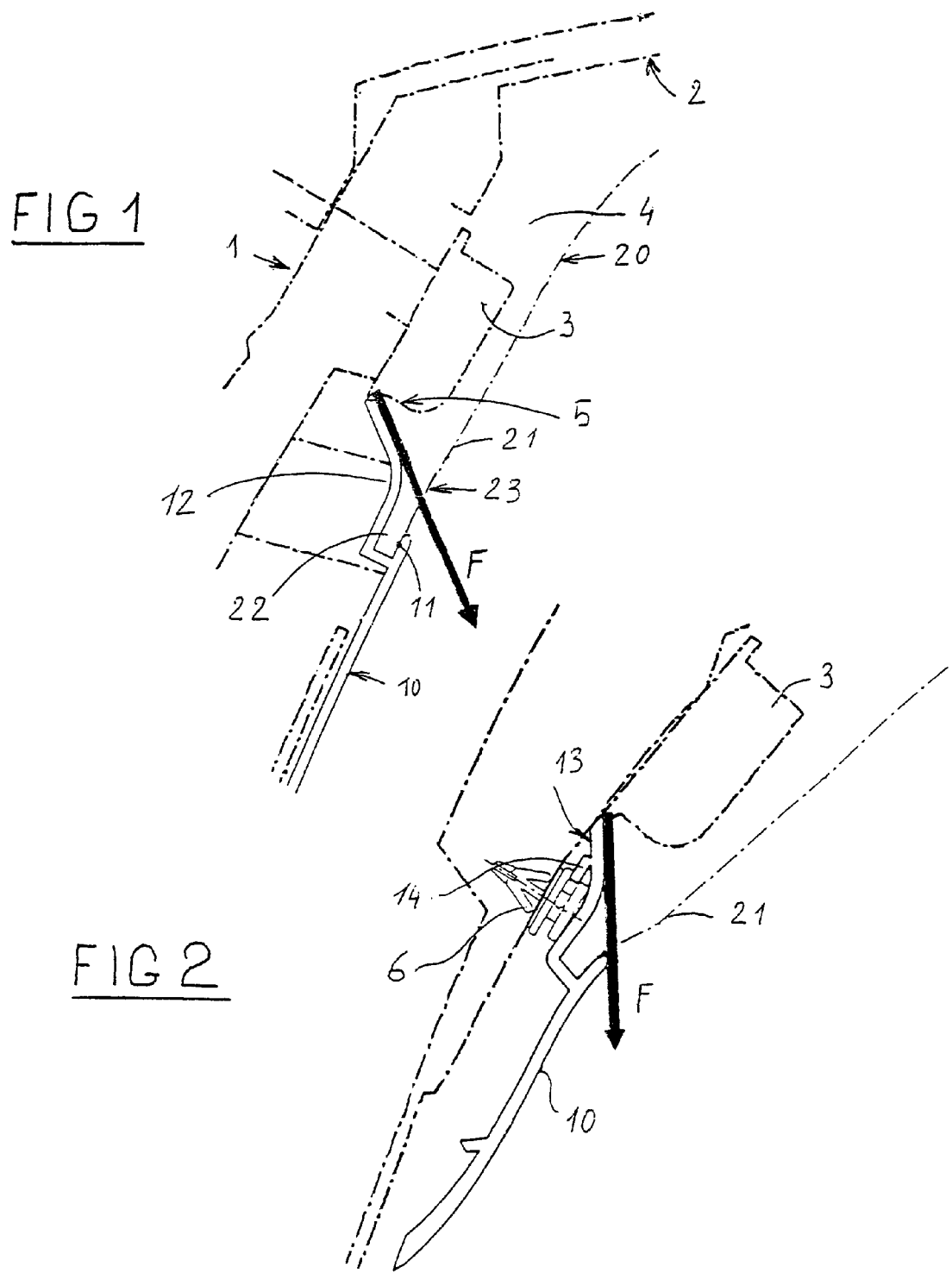

ASSISTING DEVICE FOR UNFOLDING A MOTOR VEHICLE INFLATABLE AIRBAG

The invention relates to a device for assisting the deployment of a motor vehicle airbag, and more particularly to an airbag located at the junction of two trim elements.

In order to protect the passengers during a side-impact collision there are used inflatable cushions commonly known as airbags. In response to a high-energy impact, these airbags inflate between the passenger and the side of the passenger compartment of a motor vehicle.

As described in European Patent A 0791511, one solution for integrating the airbag in view of its deployment is to fix it under the roof trim and more particularly at the limit of the said trim. The airbag is then positioned between the side window and the head of the passenger to be protected during its deployment, the border of the roof trim being deformed in order to permit passage of the said airbag.

Such deployment can be made difficult when the airbag forms a protective curtain covering the interior side parts of the vehicle. The airbag in the form of a curtain deploys not only at the level of the window parts but also at the level of the center-pillar and rear side-panel trims that form a junction with the roof trim. The junctions of the trims then create an obstacle that can interfere with deployment of the airbag.

Since the time of deployment of the airbag must be as short as possible, any obstacle that can lengthen this time may have serious consequences for the efficacy of the protective device.

In order to alleviate these disadvantages, one object of the invention is a device that ensures guidance of the airbag during its deployment.

Another object of the invention is a very low-cost guide device integrated into the trims or other parts of the motor vehicle.

According to one characteristic of the invention, it is provided with a guide surface oriented from an exit zone of the said airbag toward an end part of the second trim element, which abuts against the said guide surface and is located at the outer limit of the zone of cooperation between the first and second trim elements.

According to another characteristic of the invention, the guide surface is part of one of the trim elements.

According to another characteristic of the invention, the junction of the guide surface with the trim element forms a lip for holding the first and second trim elements in closed position relative to one another.

According to another characteristic of the invention, the guide surface is a support element of the airbag.

According to another characteristic of the invention, the guide surface is part of a body element.

According to another characteristic of the invention, the guide surface carries an element for fixation of the first trim element.

Other characteristics and advantages of the invention will become clear on reading the description of practical examples of a device for assisting the deployment of an airbag with reference to the attached drawings, wherein:

FIG. 1 illustrates a section through a side part of the vehicle provided with the device according to the invention for assisting the deployment of an airbag.

FIG. 2 illustrates another embodiment of the invention.

In the description that follows, the practical example will relate to only one side of the passenger compartment. It is self-evident that this practical example can be used on both sides of the passenger compartment of the motor vehicle. In addition, the practical example will relate to application to the rear side-panel and center-pillar trims, although it can be easily adapted to any other type of trim. The invention can also be used for any airbag other than one of the curtain type, whose deployment can be improved by using the device according to the invention.

As illustrated in FIG. 1, the motor vehicle is provided with body elements, and in particular with a passenger compartment 1 and a roof 2. These body elements are provided with interior trims, designed among other things to ensure a degree of sound insulation and above all to impart a pleasing appearance.

The side of the passenger compartment is provided, in its rear part in particular, with a rear side-panel trim and, in its center part, at the junction of the front and rear doors, with a center-pillar trim.

The roof is provided with a trim that extends over its entire surface and, via these side limits, is joined to the rear side-panel and center-pillar trims.

In our practical example, the roof trim covers an airbag device 3 which extends from front to rear of the vehicle, above the side doors. In its non-deployed state, airbag 3 is located substantially at the level of the junction of the roof trim and of the center-pillar and rear side-panel trims. The roof trim is provided with an end 21 that can be moved under the pressure exerted by the deployment of airbag 3, thus permitting the said airbag to exit rear part 4 of the trim and become interposed between the passenger and the side part of the motor vehicle. In our practical example, the rear side-panel and center-pillar trims are fixed.

To facilitate understanding of the description of the practical examples, the fixed trim elements, such as the rear side-panel and center-pillar trims, will be designated as first trim element 10, while the trim provided with a movable part 21, such as the roof trim, will be designated as second trim element 20. It is self-evident that first and second trim elements 10 and 20 can each comprise a plurality of elements.

At the level of the junction with second trim element 20, first trim element 10 is provided with a holding lip 11 for border 22 of second trim element 20. Close to lip 11, first trim element 10 is also provided with a guide surface 12 for the deployment of airbag 3, having a form inclined toward the junction of the said first and second trim elements 10 and 20. Guide surface 12 can be molded in one piece with first trim element 10. Holding lip 11 is then formed partly by the junction of guide surface 12 with first trim element 10.

The inclination of guide surface 12 is oriented from exit zone 5 of the said airbag 3 toward an end part 23 of second trim element 20, located at the outer limit of the zone of cooperation between first and second trim elements 10 and 20, in such a way as to direct airbag 3, during its deployment, toward movable end 21 of second trim element 20. In FIGS. 1 and 2, the outer limit corresponds substantially to the intersection of arrow F with movable part 21.

In addition, as illustrated in FIG. 2, and in order to facilitate fixation of first trim element 10 and to improve its stability during deployment of airbag 3, upper part 13 of guide surface 12 can be provided with fixation tabs 14 or with a catch molded directly to the trim element, which tabs cooperate with apertures made in the body elements or with catches 6 positioned on the said body. The fixation of trim 10 is then achieved by inserting tabs 14 or the catch into the apertures, thus making it possible to achieve better holding, especially in the upper part of the said trim 10.

During its deployment, airbag 3 is braced against guide surface 12, which directs the development of the said airbag 3 toward the junction of first and second trim elements 10 and 20, in the direction and sense indicated by arrow F. The pressure exerted by airbag 3 on movable part 21 of second trim element 20 produces flexion of the said movable part 21, permitting it to escape from holding lip 11. Airbag 3 then deploys along the side of the motor vehicle.

In another practical example, not illustrated, guide surface 12 is an element of the support of airbag 3, such as, for example, a part of the rigid envelope of airbag 3 or an external part having a support function.

In another practical example, not illustrated, guide surface 12 is a body element, such as, for example, a deep-drawn structure made from a piece of sheet metal.

In another practical example, not illustrated, guide surface 12 is an element made independently of the trim or body.

In these last three practical examples, guide surface 12 can be prolonged as a fixation tab of a trim element while cooperating with, for example, an aperture made in the said trim element.

The trim elements, or at least first trim element 10, can be a sheet-metal element of the body.

What is claimed is:

1. A device for assisting deployment of an airbag, located at a junction of at least two trim elements of parts of a body of a motor vehicle, wherein a first of the two trim elements is fixed and a second of the two trim elements is configured to be deformed under pressure exerted by the airbag during its deployment, the device including a guide surface oriented from an exit zone of the airbag toward an end part of the second trim element, wherein the end part, which abuts against the guide surface, is located at an external limit of a zone of cooperation between the first and second trim elements, and wherein the guide surface is a part of one of the two trim elements.

2. A device for assisting deployment according to claim 1, wherein the guide surface is a support element of the airbag.

3. A device for assisting deployment according to claim 1, wherein the guide surface is part of a body element.

4. A device for assisting deployment of an airbag, located at a junction of at least two trim elements of parts of a body of a motor vehicle, wherein a first of the two trim elements is fixed and a second of the two trim elements is configured to be deformed under pressure exerted by the airbag during its deployment, the device including a guide surface oriented from an exit zone of the airbag toward an end part of the second trim element, wherein the end part, which abuts against the guide surface, is located at an external limit of a zone of cooperation between the first and second trim elements, and wherein the junction of the guide surface with the trim element forms a lip for holding the first and second trim elements in closed position relative to one another.

5. A device for assisting deployment of an airbag, located at a junction of at least two trim elements of parts of a body of a motor vehicle, wherein a first of the two trim elements is fixed and a second of the two trim elements is configured to be deformed under pressure exerted by the airbag during its deployment, the device including a guide surface oriented from an exit zone of the airbag toward an end part of the second trim element, wherein the end part, which abuts against the guide surface, is located at an external limit of a zone of cooperation between the first and second trim elements, and wherein the guide surface carries an element for fixation of the first trim element.

* * * * *